US008595354B2

(12) United States Patent
Chen

(10) Patent No.: US 8,595,354 B2
(45) Date of Patent: Nov. 26, 2013

(54) CONTROL METHOD FOR WIRELESS COMMUNICATIONS DEVICE COMPATIBLE WITH UNIVERSAL SERIAL BUS MASS STORAGE DEVICE CLASS PROTOCOL

(75) Inventor: Yi-Chieh Chen, Taipei (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 83 days.

(21) Appl. No.: 13/345,737

(22) Filed: Jan. 8, 2012

(65) Prior Publication Data

US 2013/0179559 A1    Jul. 11, 2013

(51) Int. Cl.
  *G06F 15/16* (2006.01)
(52) U.S. Cl.
  USPC .............................................. 709/224; 710/3
(58) Field of Classification Search
  USPC ............. 709/20–202, 224–226; 710/3, 10, 15
  See application file for complete search history.

(56) References Cited

U.S. PATENT DOCUMENTS

| | | | |
|---|---|---|---|
| 8,437,278 B2 * | 5/2013 | Ogata et al. | 370/254 |
| 8,438,239 B2 * | 5/2013 | Mellott et al. | 709/217 |
| 2003/0074512 A1 | 4/2003 | Klissner | |
| 2006/0068910 A1 | 3/2006 | Schmidt | |
| 2006/0104238 A1 | 5/2006 | Hibino | |
| 2007/0115761 A1 * | 5/2007 | Song | 369/13.01 |
| 2007/0266109 A1 * | 11/2007 | Mellott et al. | 709/217 |
| 2009/0109871 A1 | 4/2009 | Ho | |
| 2009/0249204 A1 * | 10/2009 | Sugiura | 715/708 |
| 2011/0002271 A1 * | 1/2011 | Ogata et al. | 370/328 |
| 2011/0026369 A1 * | 2/2011 | Luk | 368/47 |
| 2011/0078428 A1 * | 3/2011 | Hamid | 713/2 |

* cited by examiner

*Primary Examiner* — Moustafa M Meky
(74) *Attorney, Agent, or Firm* — Winston Hsu; Scott Margo

(57) ABSTRACT

A control method for a wireless communications device compatible with a universal serial bus mass storage device class (UMS) protocol includes: monitoring an occurrence of a change in the file system; and when the change in the file system is detected, performing at least one predetermined operation corresponding to a specific predetermined file associated with the change. For example, the change in the file system may be removing the specific predetermined file from the file system or adding the specific predetermined file to the file system.

11 Claims, 7 Drawing Sheets

FIG. 3C

CONTROL METHOD FOR WIRELESS COMMUNICATIONS DEVICE COMPATIBLE WITH UNIVERSAL SERIAL BUS MASS STORAGE DEVICE CLASS PROTOCOL

BACKGROUND

The present invention relates to controlling a wireless communications device, and more particularly, to a control method for a wireless communications device compatible with a universal serial bus mass storage device class (UMS) protocol.

For a portable peripheral electronic device (e.g., a flash drive or a 3G network dongle), it often requires a driver and a control/configuring interface to function properly on a conforming device. However, the driver and the control/configuring interface may only be provided for a particular operating system (e.g. Microsoft Windows or Mac OS), thus limiting the compatibility of the portable periphery electronic device. For example, a 3G network dongle may not be recognized by a host computer running a Linux operating system, if there is no appropriate driver installed on the host computer.

Thus, there is a need for a ubiquitous control method to enhance the compatibility of portable periphery electronic devices.

SUMMARY

In accordance with exemplary embodiments of the present invention, a control method for a wireless communications device compatible with a universal serial bus mass storage device class (USB MSC or UMS) protocol is proposed to solve the above-mentioned problem.

According to one aspect of the present invention, an exemplary control method is disclosed. The exemplary control method includes: monitoring occurrence of a change in the file system; and when the change in the file system is detected, performing at least one predetermined operation corresponding to a specific predetermined file associated with the change. For example, the change in the file system is removing the specific predetermined file from the file system or adding the specific predetermined file to the file system.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3C is a diagram illustrating an exemplary web-based interface according to the first embodiment of the present invention.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

The present invention utilizes the universal serial bus mass storage device class (USB MSC or UMS) protocol to control a wireless communications device (e.g., a 3G network dongle). The UMS includes a set of computing communications protocols that run on the universal serial bus, allowing a USB device to become accessible to a host device. Due to its ubiquity and relative simplicity, the UMS may be used to implement a cross-operating-system/cross-platform control method for a wireless communications dongle with a relatively low production cost. Further details are described as below.

Figure 1:
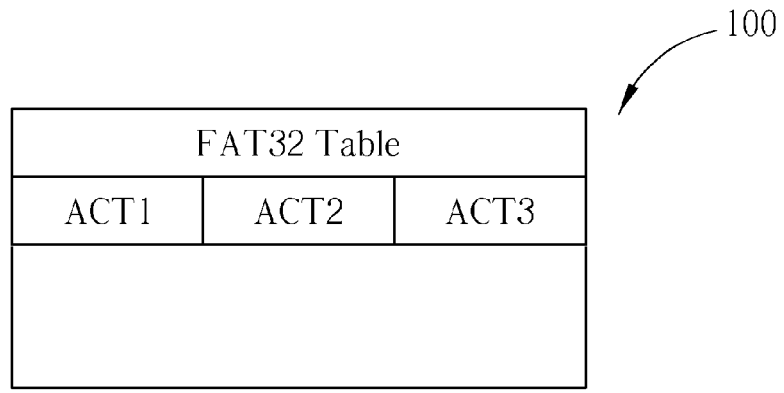
FIG. 1 is a diagram illustrating an exemplary file system of a wireless communications device according to an embodiment of the present invention.

Please refer to FIG. 1, which is a diagram illustrating an exemplary file system of a wireless communications device according to an embodiment of the present invention. The wireless communications device supports the UMS protocol. For example, the wireless communications device may be a wireless communications dongle which is externally connected to a host computer. After the wireless communications device is plugged into a host computer, the wireless communications device detects a file system of the host computer and accordingly generates the exemplary file system 100. In this embodiment, the exemplary file system 100 includes an FAT32 file table and a plurality of files ACT1, ACT2 and ACT3, wherein the files ACT1, ACT2 and ACT3 correspond to one or more predetermined operations. That is, the files ACT1, ACT2 and ACT3 are generated by a default hardware/firmware setting, and each or a combination of the files ACT1, ACT2 and ACT3 corresponds to a predetermined operation.

The file system 100 is monitored to detect occurrence of a file system change. When the file system change is detected, the corresponding predetermined operation is performed automatically. For example, if the file system change detected is removing the file ACT1 from the file system 100, the corresponding predetermined operation is to reboot the wireless communications device. Please note that, in one embodiment, the exemplary file system 100 is an FAT32 file system. However, this is for illustrative purpose only, and not meant to be a limitation of the present invention. The exemplary file system 100 may be any file system that is supported by an operating system executed on the host computer. For example, the exemplary file system 100 may be determined by detecting the file system of the host computer, and then be generated as the same file system used by the host computer. In this way, the wireless communications device can be accommodated by the host computer regardless the type of the operating systems installed thereon. In this fashion, the wireless communications device requires no additional drivers to be controlled or configured, which enables the present invention to be feasible for an ubiquitous solution.

Figure 2A:
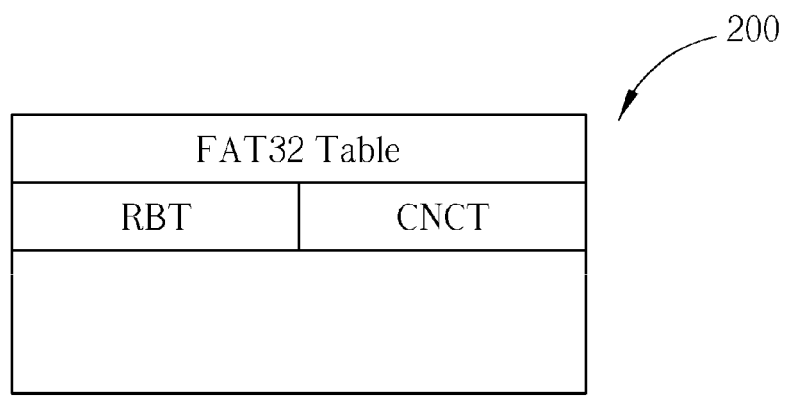
FIG. 2A and FIG. 2B are diagrams illustrating a first control mechanism of a wireless communications device according to an embodiment of the present invention.
Figure 2B:
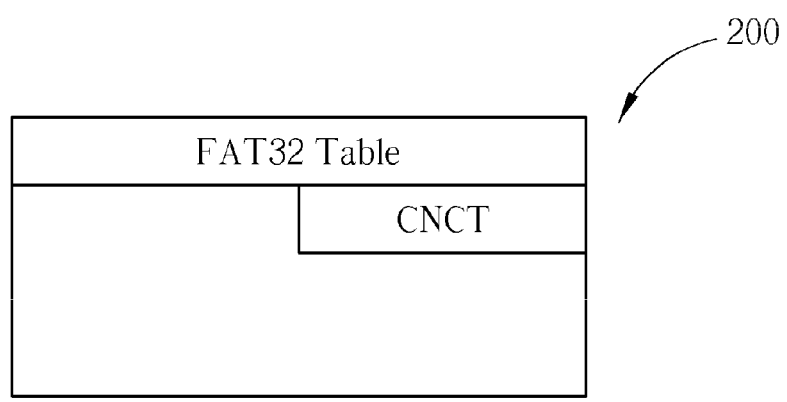

Please concurrently refer to FIG. 2A and FIG. 2B. FIG. 2A and FIG. 2B are diagrams illustrating a first control mechanism of a wireless communications device according to an embodiment of the present invention. By way of example, but not limitation, the first control mechanism may be employed on a wireless communications dongle. For example, after the wireless communications dongle is plugged into a host computer, the wireless communications dongle detects a file system of the host computer and accordingly generates the exemplary file system 200 shown in FIG. 2A. The exemplary file system 200 includes an FAT32 file table and a plurality of files named "RBT" and "CNCT", respectively. The file RBT corresponds to a reboot operation, and the file CNCT corresponds to a connection establishment operation.

The file system 200 is monitored to detect occurrence of a file system change. In FIG. 2B, the file RBT is deleted from the file system 200, resulting in a corresponding file system change. When the file RBT is deleted from the file system 200, a processor of the wireless communications dongle restarts the wireless communications dongle in response to the detected file system change (i.e., the file deletion). Similarly, if the file CNCT is deleted from the file system 200, the processor of the wireless communications dongle will establish a connection with a nearby terminal in response to the file system change (i.e., the file deletion). Please note that the first control mechanism may detect deletion of one or more of the predetermined files (i.e., the files RBT and CNCT) and to perform the predetermined corresponding operation corresponding to the deleted predetermined file(s). Those skilled in the pertinent art may readily make alternations and modifications without departing from the capacity of the first control mechanism, and these alternative designs all fall in the scope of the present invention.

Figure 3A:
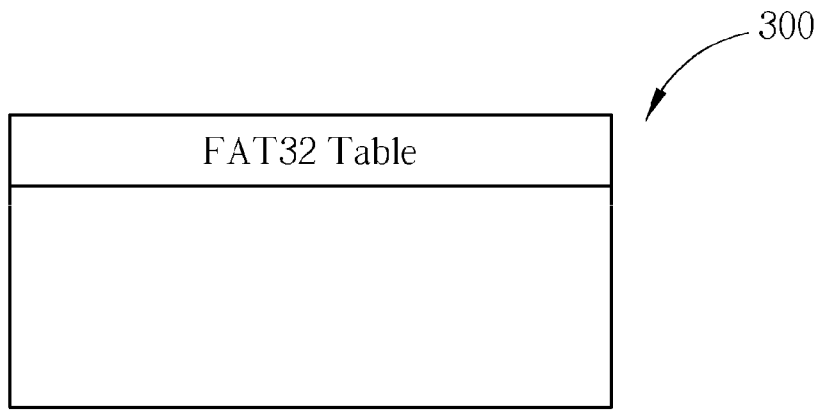
FIG. 3A and FIG. 3B are diagrams illustrating a second control mechanism of a wireless communications device according to a first embodiment of the present invention.
Figure 3B:
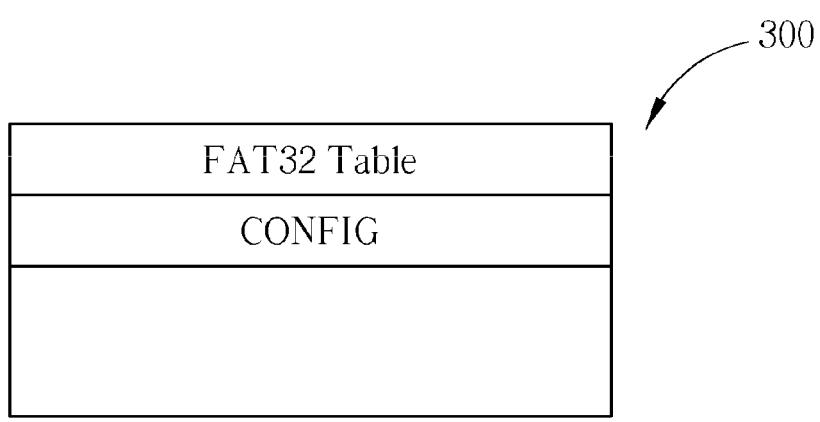

Please concurrently refer to FIG. 3A and FIG. 3B. FIG. 3A and FIG. 3B are diagrams illustrating a second control mechanism of a wireless communications device according to a first embodiment of the present invention. By way of example, but not limitation, the second control mechanism may be employed on a wireless communications dongle which is externally connected to host computer. For example, after the wireless communications dongle is plugged into a host computer, the wireless communications dongle detects a file system of the host computer and accordingly generates the exemplary file system 300 shown in FIG. 3A. The exemplary file system 300 includes an FAT32 file table. The file system 300 is monitored to detect occurrence of a file system change.

In FIG. 3B, a file named "CONFIG" is detected being added into the file system 300, resulting in a file system change correspondingly. Due to the detected file system change (i.e., the file addition), a processor of the wireless communications dongle parses the file CONFIG and accordingly generates a parsed result, and then configures the wireless communications dongle according to the parsed result. For example, the file CONFIG may contain a string, such as "APN_internet". When the processor of the wireless communications dongle detects that a file named "CONFIG" is added into the file system 300, the processor of the wireless communications dongle starts to parse the file CONFIG for hardware configuration. Next, the processor of the wireless communications dongle parses the file CONFIG and obtains the parsed result indicating that the access point name (APN) should be configured to "internet". Based on the parsed result, the processor of the wireless communications dongle configures "internet" as the APN of the wireless communications dongle and create a wireless connection with this configuration.

Figure 3C:
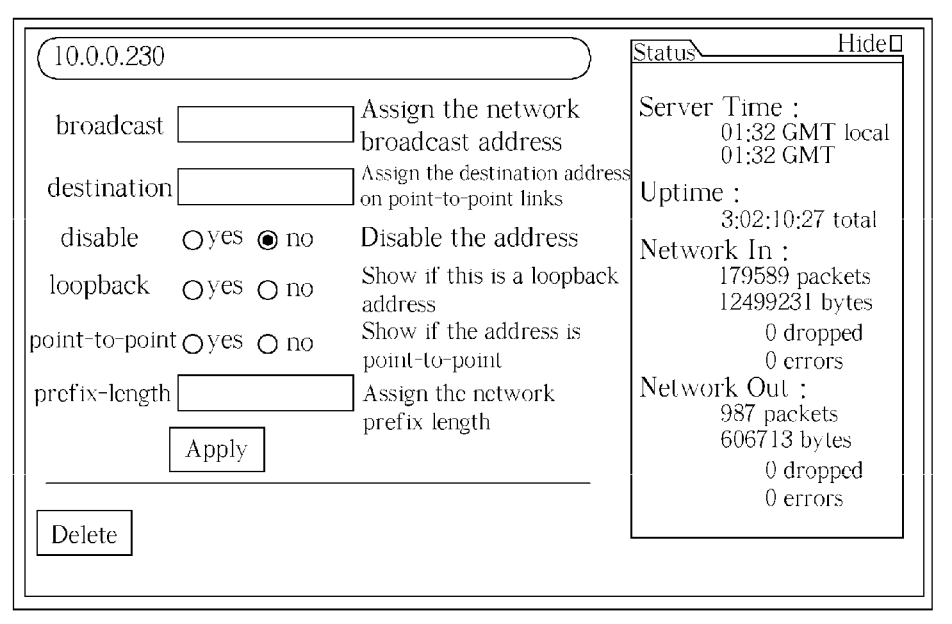

In an alternative design, the file CONFIG may contain a web-based interface (e.g. an inquiry sheet shown in FIG. 3C) implemented by hyper-text markup language (HTML) or javascript. In a case where a web browser is available, when the processor of the wireless communications dongle detects that a file named "CONFIG" is added into the file system 300, the processor of the wireless communications dongle executes the file CONFIG to display the web-based interface and then configures the wireless communications dongle according to a user's input received via the displayed web-based interface. Please note, the means of configuration is for illustrative purpose only, and not meant to be a limitation of the present invention. Those skilled in the art may readily make alternations and modifications without departing from the capacity of the first control mechanism, and these alternative designs all fall in the scope of the present invention.

Figure 4A:
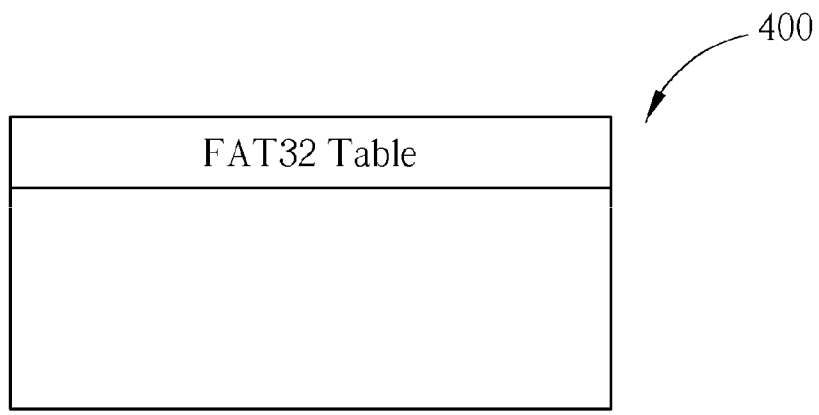
FIG. 4A and FIG. 4B are diagrams illustrating a second control mechanism of a wireless communications device according to a second embodiment of the present invention.
Figure 4B:
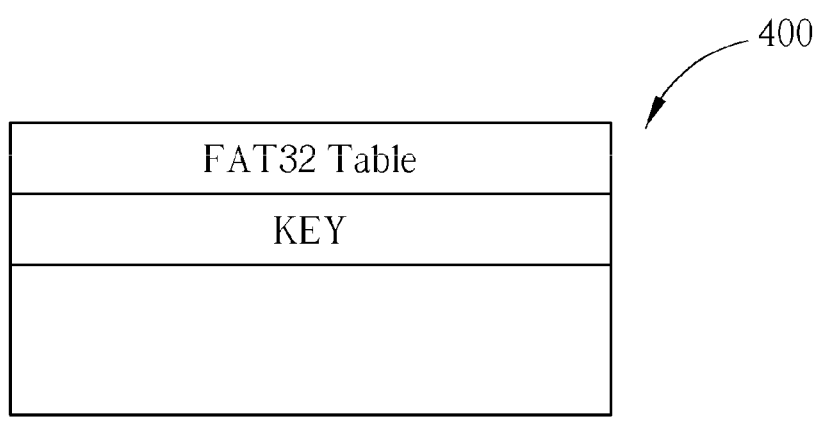

Please concurrently refer to FIG. 4A and FIG. 4B. FIG. 4A and FIG. 4B are diagrams illustrating a second control mechanism of a wireless communications device according to a second embodiment of the present invention. By way of example, but not limitation, the second control mechanism may be employed on a wireless communications dongle which is externally connected to a host computer. For example, after the wireless communications dongle is plugged into a host computer, the wireless communications dongle detects a file system of the host computer and accordingly generates the exemplary file system 400 shown in FIG. 4A. The exemplary file system 400 includes an FAT32 file table. The file system 400 is monitored to detect occurrence of a file system change.

In FIG. 4B, a file named "KEY" is detected being added into the file system 400, resulting in a file system change correspondingly. Due to the detected file system change, the processor of the wireless communications dongle parses the file KEY and accordingly generates a parsed result, and then switches the wireless communications dongle from a user mode to an engineer mode. For example, the file KEY may contain a string encoded by a certain coding algorithm. When the processor of the wireless communications dongle detects that a file named "KEY" is added into the file system 400, the processor of the wireless communications dongle starts to parse the file KEY for security verification. Next, the processor of the wireless communications dongle parses the file KEY and obtains the parsed result. If the parsed result indicates that the encoded string conforms to an engineer mode lock-up password, the processor of the wireless communications dongle will reboot the wireless communications dongle, thereby making the wireless communications dongle enter the engineer mode after rebooting.

Figure 5A:
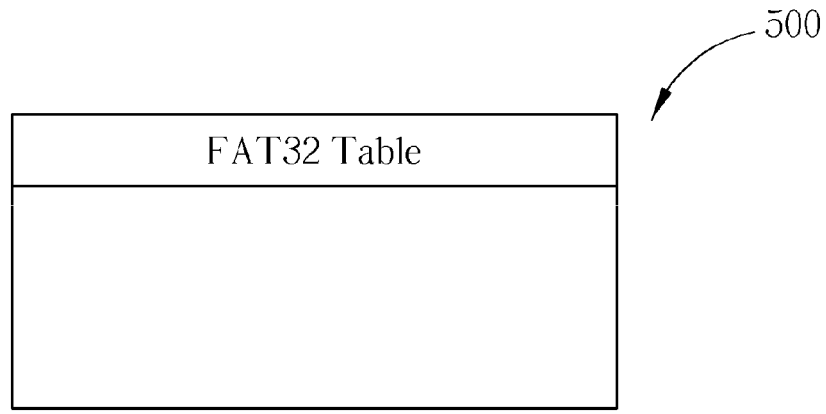
FIG. 5A and FIG. 5B are diagrams illustrating a second control mechanism of a wireless communications device according to a third embodiment of the present invention.
Figure 5B:
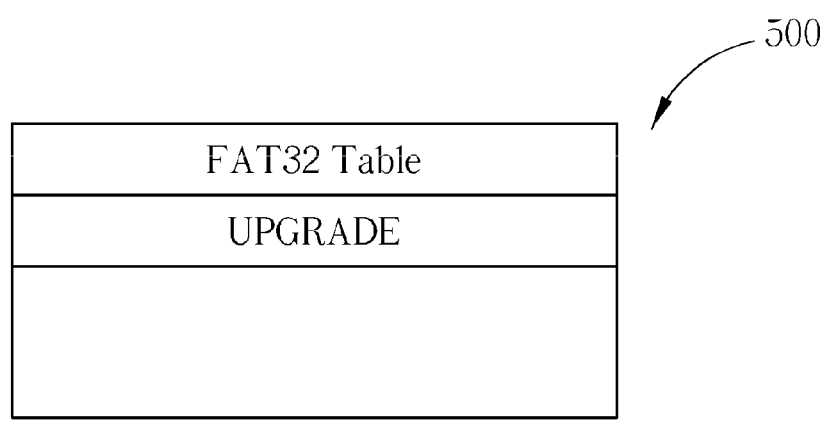

Please concurrently refer to FIG. 5A and FIG. 5B. FIG. 5A and FIG. 5B are diagrams illustrating a second control mechanism of a wireless communications device according to a third embodiment of the present invention. By way of example, but not limitation, the second control mechanism may be employed on a wireless communications dongle which is externally connected to a host computer. For example, after the wireless communications dongle is plugged into a host computer, the wireless communications dongle detects a file system of the host computer and accordingly generates the exemplary file system 500 shown in FIG. 5A. The exemplary file system 500 includes an FAT32 file table. The file system 500 is monitored to detect occurrence of a file system change. In FIG. 5B, a file named "UPGRADE" is detected being added into the file system 500, resulting in a corresponding file system change. Due to the detected file system change (e.g., the file addition), the processor of the wireless communications dongle parses the file UPGRADE and accordingly generates a parsed result, and then upgrades firmware of the wireless communications dongle.

For example, the file UPGRADE may contain a string indicating an address of a firmware upgrading server and a version number of the firmware. When the processor of the wireless communications dongle detects that a file named "UPGRADE" is added into the file system 500, the processor of the wireless communications dongle starts to parse the UPGRADE file for firmware upgrade. Next, the processor of the wireless communications dongle parses the file UPGRADE and obtains the parsed result. Based on the parsed result, the processor of the wireless communications dongle connects the wireless communications dongle to the designated firmware upgrading server and retrieves the firmware with the designated version number. After the desired firmware is correctly and successfully downloaded from the firmware upgrading server, the processor of the wireless communications dongle upgrades the wireless communications dongle with the downloaded firmware.

Figure 6A:
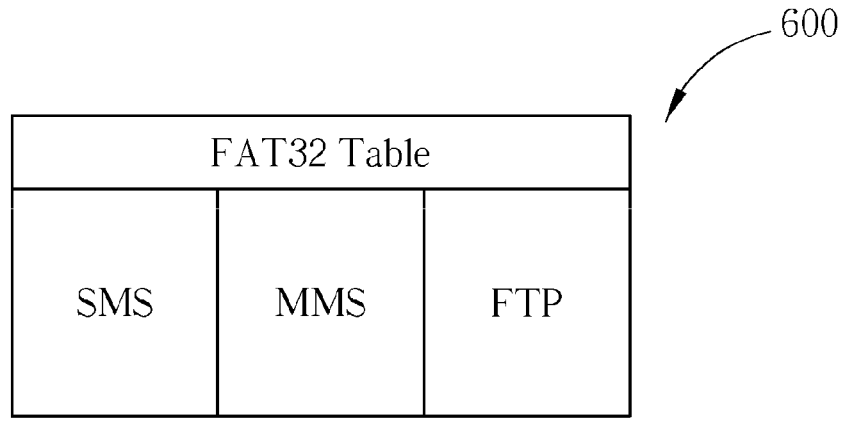
FIG. 6A and FIG. 6B are diagrams illustrating a second control mechanism of a wireless communications device according to a fourth embodiment of the present invention.
Figure 6B:
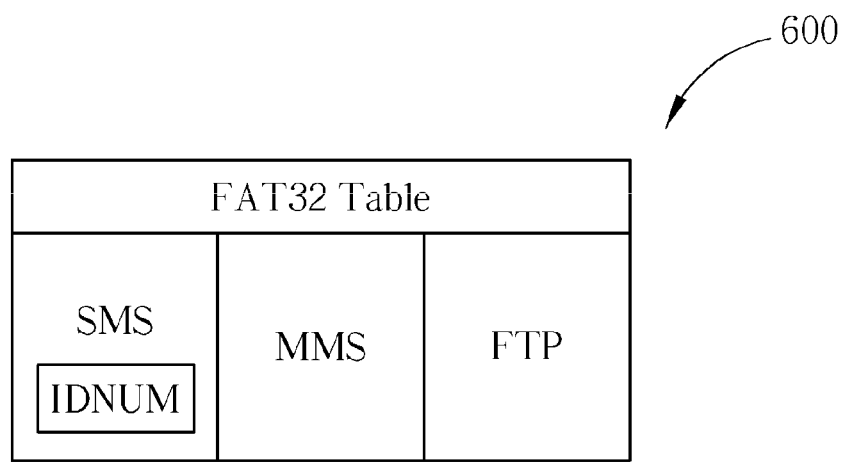

Please concurrently refer to FIG. 6A and FIG. 6B. FIG. 6A and FIG. 6B are diagrams illustrating a second control mechanism of a wireless communications device according to a fourth embodiment of the present invention. By way of example, but not limitation, the second control mechanism may be employed on a wireless communications dongle which is externally connected to a host computer. For example, after the wireless communications dongle is plugged into a host computer, the wireless communications dongle detects a file system of the host computer and accordingly generates the exemplary file system 600 shown in FIG. 6A. The exemplary file system 600 includes an FAT32 file table, and a plurality of directories named "SMS", "MMS" and "FTP", respectively. The directory SMS corresponds to a simple message service (SMS) provided by the wireless communications dongle, the directory MMS corresponds to a multimedia messaging service (MMS) provided by the wireless communications dongle, and the directory FTP corresponds to a file transfer protocol (FTP) service provided by the wireless communications dongle.

The file system 600 is monitored to detect occurrence of a file system change. In FIG. 6B, a file named "IDNUM" is detected being added into the directory SMS, resulting in a corresponding file system change. Due to the detected file system change (e.g., the file addition), the processor of the wireless communications dongle parses the file IDNUM and accordingly generates a parsed result, then creates at least one wireless communications network packet according to the parsed result, and then sends the at least one wireless communications network packet via a wireless communications network (e.g., UMTS network or GSM network). For example, the file IDNUM may contain a string indicating a callee ID and a text message. When the processor of the wireless communications dongle detects that a file named "IDNUM" is added into the directory SMS, the processor of the wireless communications dongle starts to parse the file IDNUM for simple message service. Next, the processor of the wireless communications dongle parses the file IDNUM and obtains the parsed result. The processor of the wireless communications dongle then creates an SMS message according to the parsed result, and sends the SMS message via a telecommunications network. Similarly, if the file IDNUM is detected being added into the directory MMS, the processor of the wireless communications dongle will send a MMS message instead.

Alternatively, operations regarding the directory FTP are substantially the same as operations regarding the directory SMS/MMS. A difference is that information required for establishing an FTP connection, including an IP address, a port number, an upload directory, etc., may not be included in the transferred file. That is, the information required for establishing the FTP connection may be previously configured. However, the aforementioned embodiments are for illustrative purpose only, and not meant to be limitations of the present invention. The second control mechanism detects addition of a predetermined file (e.g., a file having a predetermined file name or file header) and performs a predetermined corresponding operation corresponding to the added file.

Figure 7:
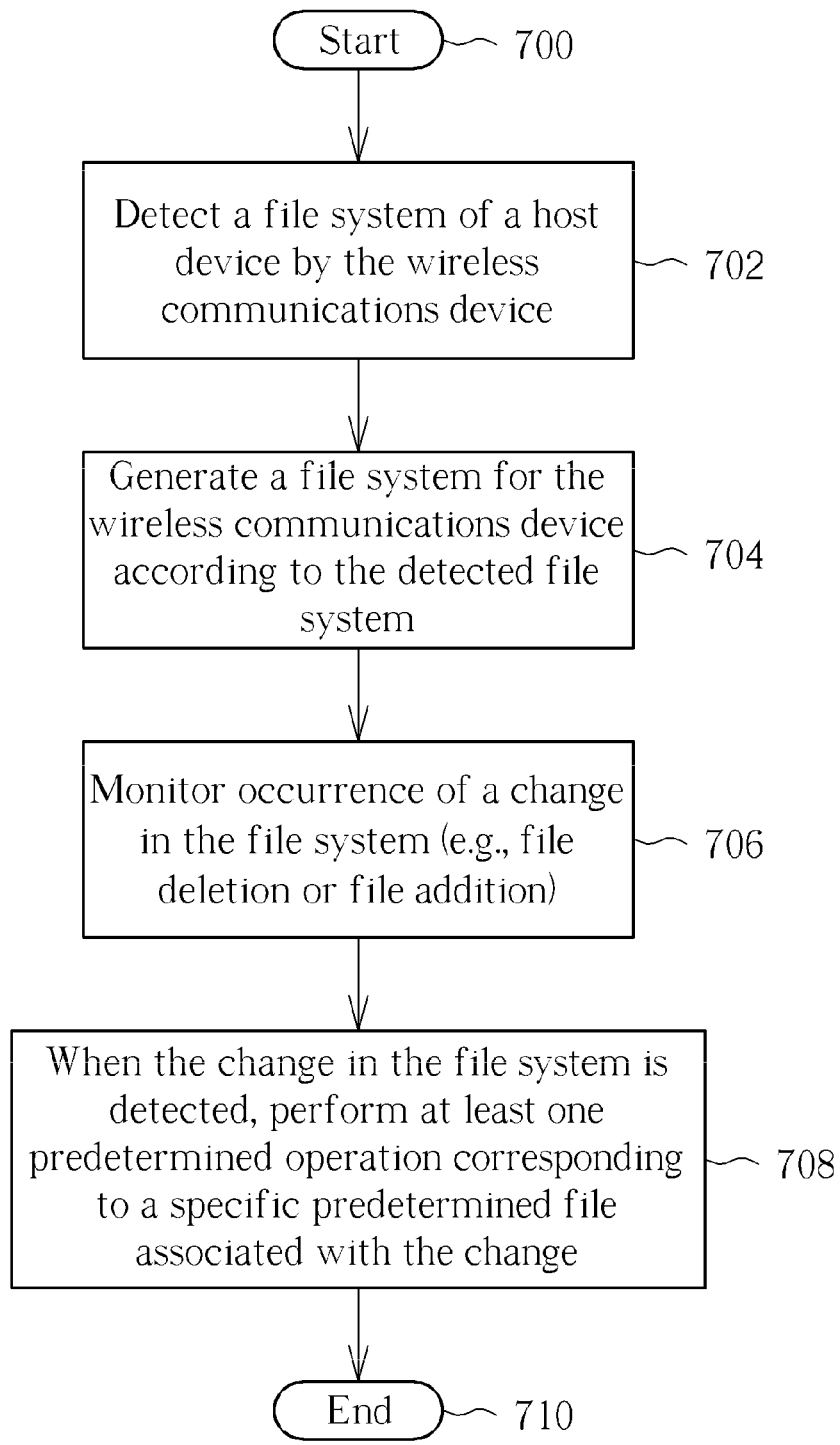
FIG. 7 is a flowchart illustrating a control method for a wireless communications device according to an embodiment of the present invention.

Please refer to FIG. 7, which is a flowchart illustrating a control method for a wireless communications device according to an embodiment of the present invention. Provided that the result is substantially the same, the steps are not required to be executed in the exact order shown in FIG. 7. The exemplary control method may be briefly summarized by following steps.

Step 700: Start.

Step 702: Detect a file system of a host device by the wireless communications device.

Step 704: Generate a file system for the wireless communications device according to the detected file system.

Step 706: Monitor occurrence of a change in the file system (e.g., file deletion or file addition).

Step 708: When the change in the file system is detected, perform at least one predetermined operation corresponding to a specific predetermined file associated with the change.

Step 710: End.

Steps 702 and 704 may be preferably performed to ensure the wireless communications device to be accommodated by the host computer regardless the type of the operating systems installed thereon. However, steps 702 and 704 may be optional under certain conditions. For example, considering a case where the wireless communications device is configured to have a fixed and pre-defined file system, the aforementioned adaptive file system generation scheme may be omitted. As a person skilled in the art can readily understand the operation of each step shown in FIG. 7 after reading above paragraphs, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method for a wireless communications device compatible with a universal serial bus mass storage device class (UMS) protocol, comprising:
utilizing the wireless communications device to detect a file system of a host device;
generating the file system for the wireless communications device according to the detected file system;
utilizing the wireless communications device to monitor occurrence of a change in the file system; and
when the change in the file system is detected, performing at least one predetermined operation corresponding to a specific predetermined file associated with the change.

2. The control method of claim 1, wherein the wireless communications device is a wireless communications dongle.

3. The control method of claim 1, wherein the change in the file system is removing the specific predetermined file from the file system.

4. The control method of claim 1, wherein the change in the file system is adding the specific predetermined file to the file system.

5. The control method of claim 4, wherein the step of performing the at least one predetermined operation corresponding to the specific predetermined file associated with the change comprises:

parsing the specific predetermined file and generating a parsed result; and configuring the wireless communications device according to the parsed result.

6. The control method of claim 4, wherein the specific predetermined file comprises a web-based interface, and the step of performing the at least one predetermined operation corresponding to the specific predetermined file associated with the change comprises:

executing the specific predetermined file to display the web-based interface; and configuring the wireless communications device according to a user's input received via the web-based interface.

7. The control method of claim 4, wherein the step of performing the at least one predetermined operation corresponding to the specific predetermined file associated with the change comprises:

parsing the specific predetermined file and generating a parsed result; and switching the wireless communications device from one operation mode to another operation mode according to the parsed result.

8. The control method of claim 4, wherein the step of performing the at least one predetermined operation corresponding to the specific predetermined file associated with the change comprises:

parsing the specific predetermined file and generating a parsed result; and upgrading a firmware of the wireless communications device according to the parsed result.

9. The control method of claim 4, wherein the step of performing the at least one predetermined operation corresponding to the specific predetermined file associated with the change comprises:

parsing the specific predetermined file and generating a parsed result;

creating at least one wireless communications network packet according to the parsed result; and sending the at least one wireless communications network packet via a wireless communications network.

10. The control method of claim 9, wherein the at least one wireless communications network packet includes information of a short message service (SMS) message or a multimedia messaging service (MMS) message.

11. The control method of claim 9, wherein the at least one wireless communications network packet is a file transfer protocol (FTP) packet.

* * * * *